(12) United States Patent
Goulden et al.

(10) Patent No.: US 8,645,941 B2
(45) Date of Patent: Feb. 4, 2014

(54) METHOD FOR ATTRIBUTING AND ALLOCATING REVENUE RELATED TO EMBEDDED SOFTWARE

(75) Inventors: David L. Goulden, Redwood City, CA (US); Charles Gilbert, San Jose, CA (US); Craig Zeldin, Redwood City, CA (US)

(73) Assignee: Carhamm Ltd., LLC, Dover, DE (US)

( * ) Notice: Subject to any disclaimer, the term of this patent is extended or adjusted under 35 U.S.C. 154(b) by 1628 days.

(21) Appl. No.: 11/368,858

(22) Filed: Mar. 6, 2006

(65) Prior Publication Data
US 2006/0235784 A1 Oct. 19, 2006

Related U.S. Application Data

(60) Provisional application No. 60/659,682, filed on Mar. 7, 2005.

(51) Int. Cl.
*G06F 9/44* (2006.01)
*G06F 21/00* (2013.01)
*G06Q 30/00* (2012.01)

(52) U.S. Cl.
USPC ............................ 717/170; 705/53; 705/14.28

(58) Field of Classification Search
None
See application file for complete search history.

(56) References Cited

U.S. PATENT DOCUMENTS

| | | | |
|---|---|---|---|
| 4,977,594 A | 12/1990 | Shear | |
| 5,247,517 A | 9/1993 | Ross et al. | |
| 5,315,580 A | 5/1994 | Phaal | |
| 5,446,919 A | 8/1995 | Wilkins | |
| 5,469,553 A | 11/1995 | Patrick | |
| 5,481,741 A | 1/1996 | McKaskle et al. | |
| 5,499,340 A * | 3/1996 | Barritz | 714/47.1 |
| 5,608,850 A | 3/1997 | Robertson | |
| 5,617,526 A | 4/1997 | Oran et al. | |
| 5,627,886 A | 5/1997 | Bowman | |
| 5,638,443 A | 6/1997 | Stefik et al. | |

(Continued)

FOREIGN PATENT DOCUMENTS

| | | |
|---|---|---|
| EP | 0822535 | 2/1998 |
| EP | 1045547 | 10/2000 |

(Continued)

OTHER PUBLICATIONS

Tynan, Dan and Tom Spring. "The Hidden Money Trail: Those programs that pelt you with ads and bog down your PC are financed by some of America's largest companies." Nov. 2005, PC World vol. 23 Issue 11. Retrieved from ProQuest Computing. pp. 71-80.*

(Continued)

*Primary Examiner* — Don Wong
*Assistant Examiner* — Erika Kretzmer
(74) *Attorney, Agent, or Firm* — Brundidge & Stanger, P.C.

(57) ABSTRACT

A method for attributing revenue for embedded software. The method includes the first step of determining the presence of more than one type of embedded software on a given client site. Then, the process assigns priority based on the length of time each type has resided on the client system and the source of each type, followed by classifying each software type, based on the history of present and predecessor copies of the software. A distribution factor is applied to each software type, based on priority and classification, partner revenue is distributed based on the distribution factor applied to each software type.

16 Claims, 3 Drawing Sheets

(56) References Cited

U.S. PATENT DOCUMENTS

| | | |
|---|---|---|
| 5,642,484 A | 6/1997 | Harrison, III et al. |
| 5,675,510 A | 10/1997 | Coffey et al. |
| 5,682,525 A | 10/1997 | Bouve et al. |
| 5,706,502 A | 1/1998 | Foley et al. |
| 5,708,709 A | 1/1998 | Rose |
| 5,708,780 A | 1/1998 | Levergood et al. |
| 5,710,918 A | 1/1998 | Lagarde et al. |
| 5,712,979 A | 1/1998 | Graber et al. |
| 5,715,453 A | 2/1998 | Stewart |
| 5,717,860 A | 2/1998 | Graber et al. |
| 5,717,923 A | 2/1998 | Dedrick |
| 5,724,521 A | 3/1998 | Dedrick |
| 5,724,567 A | 3/1998 | Rose et al. |
| 5,734,863 A | 3/1998 | Kodosky et al. |
| 5,745,681 A | 4/1998 | Levine et al. |
| 5,751,956 A | 5/1998 | Kirsch |
| 5,754,938 A | 5/1998 | Herz et al. |
| 5,758,111 A | 5/1998 | Shiratori et al. |
| 5,761,662 A | 6/1998 | Dasan |
| 5,787,253 A | 7/1998 | McCreery et al. |
| 5,794,259 A | 8/1998 | Kikinis |
| 5,796,952 A | 8/1998 | Davis et al. |
| 5,809,242 A | 9/1998 | Shaw et al. |
| 5,812,642 A | 9/1998 | Leroy |
| 5,812,769 A | 9/1998 | Graber et al. |
| 5,819,047 A | 10/1998 | Bauer et al. |
| 5,819,092 A | 10/1998 | Ferguson et al. |
| 5,822,526 A | 10/1998 | Waskiewicz |
| 5,832,502 A | 11/1998 | Durham et al. |
| 5,835,087 A | 11/1998 | Herz et al. |
| 5,835,722 A | 11/1998 | Bradshaw et al. |
| 5,848,396 A | 12/1998 | Gerace |
| 5,854,897 A | 12/1998 | Radziewicz et al. |
| 5,872,850 A | 2/1999 | Klein et al. |
| 5,875,296 A | 2/1999 | Shi et al. |
| 5,883,955 A | 3/1999 | Ronning |
| 5,887,133 A | 3/1999 | Brown et al. |
| 5,893,118 A | 4/1999 | Sonderegger |
| 5,898,434 A | 4/1999 | Small et al. |
| 5,901,287 A | 5/1999 | Bull et al. |
| 5,905,492 A | 5/1999 | Straub et al. |
| 5,918,014 A | 6/1999 | Robinson |
| 5,920,697 A | 7/1999 | Masters et al. |
| 5,923,845 A | 7/1999 | Kamiya et al. |
| 5,930,700 A | 7/1999 | Pepper et al. |
| 5,933,811 A | 8/1999 | Angles et al. |
| 5,937,037 A | 8/1999 | Kamel et al. |
| 5,943,478 A | 8/1999 | Aggarwal et al. |
| 5,948,061 A | 9/1999 | Merriman et al. |
| 5,958,015 A | 9/1999 | Dascalu |
| 5,959,621 A | 9/1999 | Nawaz et al. |
| 5,961,593 A | 10/1999 | Gabber et al. |
| 5,963,915 A | 10/1999 | Kirsch |
| 5,978,836 A | 11/1999 | Ouchi |
| 5,987,606 A | 11/1999 | Cirasole et al. |
| 5,991,735 A | 11/1999 | Gerace |
| 5,995,597 A | 11/1999 | Woltz et al. |
| 5,996,011 A | 11/1999 | Humes |
| 5,999,740 A | 12/1999 | Rowley |
| 6,006,252 A | 12/1999 | Wolfe |
| 6,009,410 A | 12/1999 | LeMole et al. |
| 6,011,537 A | 1/2000 | Slotznick |
| 6,014,502 A | 1/2000 | Moraes |
| 6,014,638 A | 1/2000 | Burge et al. |
| 6,014,711 A | 1/2000 | Brown |
| 6,026,368 A | 2/2000 | Brown et al. |
| 6,026,933 A | 2/2000 | King et al. |
| 6,029,141 A | 2/2000 | Bezos et al. |
| 6,029,145 A * | 2/2000 | Barritz et al. .................. 705/34 |
| 6,029,195 A | 2/2000 | Herz |
| 6,047,327 A | 4/2000 | Tso et al. |
| 6,052,709 A | 4/2000 | Paul |
| 6,052,730 A | 4/2000 | Felciano et al. |
| 6,065,056 A | 5/2000 | Bradshaw et al. |
| 6,067,561 A | 5/2000 | Dillon |
| 6,070,140 A | 5/2000 | Tran |
| 6,073,105 A | 6/2000 | Sutcliffe et al. |
| 6,073,241 A | 6/2000 | Rosenberg et al. |
| 6,076,166 A | 6/2000 | Moshfeghi et al. |
| 6,078,916 A | 6/2000 | Culliss |
| 6,088,731 A | 7/2000 | Kiraly et al. |
| 6,101,510 A | 8/2000 | Stone et al. |
| 6,108,637 A | 8/2000 | Blumenau |
| 6,108,691 A | 8/2000 | Lee et al. |
| 6,108,799 A | 8/2000 | Boulay et al. |
| 6,112,215 A | 8/2000 | Kaply |
| 6,115,680 A | 9/2000 | Coffee et al. |
| 6,119,098 A | 9/2000 | Guyot et al. |
| 6,122,632 A | 9/2000 | Botts et al. |
| 6,128,663 A | 10/2000 | Thomas |
| 6,133,912 A | 10/2000 | Montero |
| 6,133,918 A | 10/2000 | Conrad et al. |
| 6,134,532 A | 10/2000 | Lazarus et al. |
| 6,138,146 A | 10/2000 | Moon et al. |
| 6,138,155 A | 10/2000 | Davis et al. |
| 6,141,010 A | 10/2000 | Hoyle |
| 6,144,944 A | 11/2000 | Kurtzman, II et al. |
| 6,151,596 A | 11/2000 | Hosomi |
| 6,154,738 A | 11/2000 | Call |
| 6,161,112 A | 12/2000 | Cragun et al. |
| 6,163,778 A | 12/2000 | Fogg et al. |
| 6,182,097 B1 | 1/2001 | Hansen et al. |
| 6,183,366 B1 | 2/2001 | Goldberg et al. |
| 6,185,614 B1 | 2/2001 | Cuomo et al. |
| 6,192,380 B1 | 2/2001 | Light et al. |
| 6,199,079 B1 | 3/2001 | Gupta et al. |
| 6,208,339 B1 | 3/2001 | Atlas et al. |
| 6,216,141 B1 | 4/2001 | Straub et al. |
| 6,222,520 B1 | 4/2001 | Gerszberg et al. |
| 6,233,564 B1 | 5/2001 | Schulze, Jr. |
| 6,237,022 B1 | 5/2001 | Bruck et al. |
| 6,249,284 B1 | 6/2001 | Bogdan |
| 6,253,188 B1 | 6/2001 | Witek et al. |
| 6,253,208 B1 | 6/2001 | Wittgreffe et al. |
| 6,266,058 B1 | 7/2001 | Meyer |
| 6,269,361 B1 | 7/2001 | Davis et al. |
| 6,285,987 B1 | 9/2001 | Roth et al. |
| 6,286,043 B1 | 9/2001 | Cuomo et al. |
| 6,295,061 B1 | 9/2001 | Park et al. |
| 6,297,819 B1 | 10/2001 | Furst |
| 6,304,844 B1 | 10/2001 | Pan et al. |
| 6,308,202 B1 | 10/2001 | Cohn et al. |
| 6,311,194 B1 | 10/2001 | Sheth et al. |
| 6,314,451 B1 | 11/2001 | Landsman et al. |
| 6,314,457 B1 | 11/2001 | Schena et al. |
| 6,317,761 B1 | 11/2001 | Landsman et al. |
| 6,321,209 B1 | 11/2001 | Pasquali |
| 6,321,256 B1 | 11/2001 | Himmel et al. |
| 6,324,553 B1 | 11/2001 | Cragun et al. |
| 6,324,569 B1 | 11/2001 | Ogilvie et al. |
| 6,324,583 B1 | 11/2001 | Stevens |
| 6,327,574 B1 | 12/2001 | Kramer et al. |
| 6,327,617 B1 | 12/2001 | Fawcett |
| 6,332,127 B1 | 12/2001 | Bandera |
| 6,334,111 B1 | 12/2001 | Carrott |
| 6,335,963 B1 | 1/2002 | Bosco |
| 6,336,131 B1 | 1/2002 | Wolfe |
| 6,338,059 B1 | 1/2002 | Fields et al. |
| 6,338,066 B1 | 1/2002 | Martin et al. |
| 6,341,305 B2 | 1/2002 | Wolfe |
| 6,347,398 B1 | 2/2002 | Parthasarathy et al. |
| 6,351,279 B1 | 2/2002 | Sawyer |
| 6,351,745 B1 | 2/2002 | Itakura et al. |
| 6,356,898 B2 | 3/2002 | Cohen et al. |
| 6,356,908 B1 | 3/2002 | Brown et al. |
| 6,360,221 B1 | 3/2002 | Gough et al. |
| 6,366,298 B1 | 4/2002 | Haitsuka |
| 6,370,527 B1 | 4/2002 | Singhal |
| 6,377,983 B1 | 4/2002 | Cohen et al. |
| 6,378,075 B1 | 4/2002 | Goldstein et al. |
| 6,381,735 B1 | 4/2002 | Hunt |
| 6,381,742 B2 | 4/2002 | Forbes et al. |
| 6,385,592 B1 | 5/2002 | Angles et al. |
| 6,392,668 B1 | 5/2002 | Murray |

(56) References Cited

U.S. PATENT DOCUMENTS

| | | |
|---|---|---|
| 6,393,407 B1 | 5/2002 | Middleton et al. |
| 6,393,415 B1 | 5/2002 | Getchius et al. |
| 6,397,228 B1 | 5/2002 | Lamburt et al. |
| 6,401,075 B1 | 6/2002 | Mason et al. |
| 6,415,322 B1 | 7/2002 | Jaye |
| 6,418,440 B1 | 7/2002 | Kuo et al. |
| 6,418,471 B1 | 7/2002 | Shelton et al. |
| 6,421,675 B1 | 7/2002 | Ryan et al. |
| 6,421,724 B1 | 7/2002 | Nickerson et al. |
| 6,434,745 B1 | 8/2002 | Conley, Jr. et al. |
| 6,438,215 B1 | 8/2002 | Skladman et al. |
| 6,438,578 B1 | 8/2002 | Schmid et al. |
| 6,438,579 B1 | 8/2002 | Hosken |
| 6,442,529 B1 | 8/2002 | Krishan et al. |
| 6,446,128 B1 | 9/2002 | Woods et al. |
| 6,449,657 B2 | 9/2002 | Stanbach, Jr. et al. |
| 6,457,009 B1 | 9/2002 | Bollay |
| 6,459,440 B1 | 10/2002 | Monnes et al. |
| 6,460,036 B1 | 10/2002 | Herz |
| 6,460,042 B1 | 10/2002 | Hitchcock et al. |
| 6,460,060 B1 | 10/2002 | Maddalozzo et al. |
| 6,466,970 B1 | 10/2002 | Lee et al. |
| 6,477,550 B1 | 11/2002 | Balasubramaniam et al. |
| 6,477,575 B1 | 11/2002 | Koeppel et al. |
| 6,480,837 B1 | 11/2002 | Dutta |
| 6,490,722 B1 | 12/2002 | Barton et al. |
| 6,493,702 B1 | 12/2002 | Adar et al. |
| 6,496,931 B1 | 12/2002 | Rajchel et al. |
| 6,502,076 B1 | 12/2002 | Smith |
| 6,513,052 B1 | 1/2003 | Binder |
| 6,513,060 B1 | 1/2003 | Nixon et al. |
| 6,516,312 B1 | 2/2003 | Kraft et al. |
| 6,523,021 B1 | 2/2003 | Monberg et al. |
| 6,529,903 B2 | 3/2003 | Smith et al. |
| 6,539,375 B2 | 3/2003 | Kawasaki |
| 6,539,424 B1 | 3/2003 | Dutta |
| 6,564,202 B1 | 5/2003 | Schuetze et al. |
| 6,567,850 B1 | 5/2003 | Freishtat et al. |
| 6,567,854 B1 | 5/2003 | Olshansky et al. |
| 6,570,595 B2 | 5/2003 | Porter |
| 6,584,492 B1 | 6/2003 | Cezar et al. |
| 6,594,654 B1 | 7/2003 | Salam et al. |
| 6,601,041 B1 | 7/2003 | Brown et al. |
| 6,601,057 B1 | 7/2003 | Underwood et al. |
| 6,601,100 B2 | 7/2003 | Lee et al. |
| 6,604,103 B1 | 8/2003 | Wolfe |
| 6,615,247 B1 | 9/2003 | Murphy |
| 6,631,360 B1 | 10/2003 | Cook |
| 6,642,944 B2 | 11/2003 | Conrad et al. |
| 6,643,696 B2 | 11/2003 | Davis et al. |
| 6,665,656 B1 | 12/2003 | Carter |
| 6,665,838 B1 | 12/2003 | Brown et al. |
| 6,678,866 B1 | 1/2004 | Sugimoto et al. |
| 6,681,223 B1 | 1/2004 | Sundaresan |
| 6,681,247 B1 | 1/2004 | Payton |
| 6,686,931 B1 | 2/2004 | Bodnar |
| 6,687,737 B2 | 2/2004 | Landsman et al. |
| 6,691,106 B1 | 2/2004 | Sathyanarayan |
| 6,697,825 B1 | 2/2004 | Underwood et al. |
| 6,701,362 B1 | 3/2004 | Subramonian |
| 6,701,363 B1 | 3/2004 | Chiu et al. |
| 6,714,975 B1 | 3/2004 | Aggarwal et al. |
| 6,718,365 B1 | 4/2004 | Dutta |
| 6,721,795 B1 | 4/2004 | Eldreth |
| 6,725,269 B1 | 4/2004 | Megiddo |
| 6,741,967 B1 | 5/2004 | Wu et al. |
| 6,757,661 B1 | 6/2004 | Blaser et al. |
| 6,760,746 B1 | 7/2004 | Schneider |
| 6,763,379 B1 | 7/2004 | Shuster |
| 6,763,386 B2 | 7/2004 | Davis et al. |
| 6,771,290 B1 | 8/2004 | Hoyle |
| 6,772,200 B1 | 8/2004 | Bakshi et al. |
| 6,785,659 B1 | 8/2004 | Landsman et al. |
| 6,785,723 B1 | 8/2004 | Genty et al. |
| 6,801,906 B1 | 10/2004 | Bates et al. |
| 6,826,534 B1 | 11/2004 | Gupta et al. |
| 6,826,546 B1 | 11/2004 | Shuster |
| 6,827,669 B2 | 12/2004 | Cohen et al. |
| 6,847,969 B1 | 1/2005 | Mathai et al. |
| 6,848,004 B1 | 1/2005 | Chang et al. |
| 6,850,967 B1 | 2/2005 | Spencer et al. |
| 6,853,982 B2 | 2/2005 | Smith et al. |
| 6,857,024 B1 | 2/2005 | Chen et al. |
| 6,874,018 B2 | 3/2005 | Wu |
| 6,877,027 B1 | 4/2005 | Spencer et al. |
| 6,882,981 B2 | 4/2005 | Philippe et al. |
| 6,892,181 B1 | 5/2005 | Megiddo et al. |
| 6,892,223 B1 | 5/2005 | Kawabata et al. |
| 6,892,354 B1 | 5/2005 | Servan-Schreiber et al. |
| 6,904,408 B1 | 6/2005 | McCarthy et al. |
| 6,910,179 B1 | 6/2005 | Pennell et al. |
| 6,938,027 B1 * | 8/2005 | Barritz et al. .................. 709/223 |
| 6,958,759 B2 | 10/2005 | Safadi et al. |
| 6,968,507 B2 | 11/2005 | Pennell et al. |
| 6,880,123 B1 | 12/2005 | Landsman |
| 6,973,478 B1 | 12/2005 | Ketonen et al. |
| 6,976,053 B1 | 12/2005 | Tripp et al. |
| 6,976,090 B2 | 12/2005 | Ben-Shaul et al. |
| 7,039,599 B2 | 5/2006 | Merriman et al. |
| 7,043,526 B1 | 5/2006 | Wolfe |
| 7,051,315 B2 * | 5/2006 | Artzi et al. ..................... 717/103 |
| 7,054,900 B1 | 5/2006 | Goldston |
| 7,076,546 B1 | 7/2006 | Bates et al. |
| 7,085,682 B1 | 8/2006 | Heller et al. |
| 7,100,111 B2 | 8/2006 | McElfresh et al. |
| 7,103,643 B1 * | 9/2006 | Jacobs et al. .................. 709/219 |
| 7,136,875 B2 | 11/2006 | Anderson et al. |
| 7,162,739 B2 | 1/2007 | Cowden et al. |
| 7,181,415 B2 | 2/2007 | Blaser et al. |
| 7,283,992 B2 | 10/2007 | Liu et al. |
| 7,346,606 B2 | 3/2008 | Bharat |
| 7,349,827 B1 | 3/2008 | Heller et al. |
| 7,363,291 B1 | 4/2008 | Page |
| 7,421,432 B1 | 9/2008 | Hoelzle et al. |
| 7,512,603 B1 | 3/2009 | Veteska et al. |
| 7,765,592 B2 * | 7/2010 | Wang et al. ..................... 726/22 |
| 7,844,488 B2 | 11/2010 | Merriman et al. |
| 2001/0030970 A1 | 10/2001 | Wiryaman et al. |
| 2001/0032115 A1 | 10/2001 | Goldstein |
| 2001/0037240 A1 | 11/2001 | Marks et al. |
| 2001/0037325 A1 | 11/2001 | Biderman et al. |
| 2001/0037488 A1 | 11/2001 | Lee |
| 2001/0044795 A1 | 11/2001 | Cohen et al. |
| 2001/0049320 A1 | 12/2001 | Cohen et al. |
| 2001/0049321 A1 | 12/2001 | Cohen et al. |
| 2001/0049620 A1 | 12/2001 | Blasko |
| 2001/0049716 A1 | 12/2001 | Wolfe |
| 2001/0051559 A1 | 12/2001 | Cohen et al. |
| 2001/0053735 A1 | 12/2001 | Cohen et al. |
| 2001/0054020 A1 | 12/2001 | Barth et al. |
| 2002/0002538 A1 | 1/2002 | Ling |
| 2002/0004754 A1 | 1/2002 | Gardenswartz |
| 2002/0007307 A1 | 1/2002 | Miller |
| 2002/0007309 A1 | 1/2002 | Reynar |
| 2002/0010626 A1 | 1/2002 | Agmoni |
| 2002/0016736 A1 | 2/2002 | Cannon et al. |
| 2002/0019834 A1 | 2/2002 | Vilcauskas, Jr. et al. |
| 2002/0023159 A1 | 2/2002 | Vange et al. |
| 2002/0026390 A1 | 2/2002 | Ulenas et al. |
| 2002/0032592 A1 | 3/2002 | Krasnick et al. |
| 2002/0038363 A1 | 3/2002 | MacLean |
| 2002/0042750 A1 | 4/2002 | Morrison |
| 2002/0046099 A1 | 4/2002 | Frengut et al. |
| 2002/0049633 A1 | 4/2002 | Pasquali |
| 2002/0052785 A1 | 5/2002 | Tenenbaum |
| 2002/0052925 A1 | 5/2002 | Kim et al. |
| 2002/0055912 A1 | 5/2002 | Buck |
| 2002/0059094 A1 | 5/2002 | Hosea et al. |
| 2002/0059099 A1 | 5/2002 | Coletta |
| 2002/0065802 A1 | 5/2002 | Uchiyama |
| 2002/0068500 A1 | 6/2002 | Gabai et al. |
| 2002/0069105 A1 | 6/2002 | do Rosario Botelho et al. |
| 2002/0077219 A1 | 6/2002 | Cohen et al. |
| 2002/0078076 A1 | 6/2002 | Evans |

(56) References Cited

U.S. PATENT DOCUMENTS

| | | |
|---|---|---|
| 2002/0078192 A1 | 6/2002 | Kopsell et al. |
| 2002/0087717 A1* | 7/2002 | Artzi et al. .................... 709/236 |
| 2002/0091700 A1 | 7/2002 | Steele et al. |
| 2002/0091875 A1 | 7/2002 | Fujiwara et al. |
| 2002/0094868 A1 | 7/2002 | Tuck et al. |
| 2002/0099605 A1 | 7/2002 | Weitzman et al. |
| 2002/0099824 A1 | 7/2002 | Bender et al. |
| 2002/0107847 A1 | 8/2002 | Johnson |
| 2002/0107858 A1 | 8/2002 | Lundahl et al. |
| 2002/0111910 A1 | 8/2002 | Walsh |
| 2002/0111994 A1 | 8/2002 | Raghunandan |
| 2002/0112035 A1 | 8/2002 | Carey et al. |
| 2002/0112048 A1 | 8/2002 | Gruyer et al. |
| 2002/0116494 A1 | 8/2002 | Kocol |
| 2002/0120648 A1 | 8/2002 | Ball et al. |
| 2002/0122065 A1 | 9/2002 | Segal et al. |
| 2002/0123912 A1 | 9/2002 | Subramanian et al. |
| 2002/0128904 A1 | 9/2002 | Carruthers et al. |
| 2002/0128925 A1 | 9/2002 | Angeles |
| 2002/0152121 A1 | 10/2002 | Hiroshi |
| 2002/0152222 A1 | 10/2002 | Holbrook |
| 2002/0154163 A1 | 10/2002 | Melchner |
| 2002/0156781 A1 | 10/2002 | Cordray et al. |
| 2002/0156812 A1 | 10/2002 | Krasnoiarov et al. |
| 2002/0169670 A1 | 11/2002 | Barsade et al. |
| 2002/0169762 A1 | 11/2002 | Cardona |
| 2002/0171682 A1 | 11/2002 | Frank et al. |
| 2002/0175947 A1 | 11/2002 | Conrad et al. |
| 2002/0194151 A1 | 12/2002 | Fenton et al. |
| 2003/0005067 A1 | 1/2003 | Martin et al. |
| 2003/0005134 A1 | 1/2003 | Martin et al. |
| 2003/0014399 A1 | 1/2003 | Hansen et al. |
| 2003/0018778 A1 | 1/2003 | Martin et al. |
| 2003/0023481 A1 | 1/2003 | Calvert et al. |
| 2003/0023698 A1 | 1/2003 | Dieberger et al. |
| 2003/0028870 A1 | 2/2003 | Weisman et al. |
| 2003/0032409 A1 | 2/2003 | Hutcheson et al. |
| 2003/0033155 A1 | 2/2003 | Peerson et al. |
| 2003/0041050 A1 | 2/2003 | Smith et al. |
| 2003/0046150 A1 | 3/2003 | Ader et al. |
| 2003/0050863 A1 | 3/2003 | Radwin |
| 2003/0088554 A1 | 5/2003 | Ryan et al. |
| 2003/0105589 A1 | 6/2003 | Liu et al. |
| 2003/0110080 A1 | 6/2003 | Tsutani et al. |
| 2003/0115157 A1* | 6/2003 | Circenis ..................... 705/400 |
| 2003/0120593 A1 | 6/2003 | Bansal et al. |
| 2003/0120654 A1 | 6/2003 | Edlund et al. |
| 2003/0131100 A1 | 7/2003 | Godon et al. |
| 2003/0135490 A1 | 7/2003 | Barrett et al. |
| 2003/0154168 A1 | 8/2003 | Lautenbacher |
| 2003/0171990 A1 | 9/2003 | Rao et al. |
| 2003/0172075 A1 | 9/2003 | Reisman |
| 2003/0195877 A1 | 10/2003 | Ford et al. |
| 2003/0208472 A1 | 11/2003 | Pham |
| 2003/0221167 A1 | 11/2003 | Goldstein et al. |
| 2004/0002896 A1 | 1/2004 | Alanen et al. |
| 2004/0024756 A1 | 2/2004 | Rickard |
| 2004/0068486 A1 | 4/2004 | Chidlovskii |
| 2004/0073485 A1 | 4/2004 | Liu et al. |
| 2004/0078294 A1 | 4/2004 | Rollins et al. |
| 2004/0095376 A1 | 5/2004 | Graham et al. |
| 2004/0098229 A1 | 5/2004 | Error et al. |
| 2004/0098449 A1 | 5/2004 | Bar-Lavi et al. |
| 2004/0133845 A1 | 7/2004 | Forstall et al. |
| 2004/0163101 A1 | 8/2004 | Swix et al. |
| 2004/0167926 A1 | 8/2004 | Waxman et al. |
| 2004/0167928 A1 | 8/2004 | Anderson et al. |
| 2004/0181525 A1 | 9/2004 | Itzhak et al. |
| 2004/0193488 A1 | 9/2004 | Khoo et al. |
| 2004/0225716 A1 | 11/2004 | Shamir et al. |
| 2004/0247748 A1 | 12/2004 | Bronkema |
| 2004/0249709 A1 | 12/2004 | Donovan et al. |
| 2004/0249938 A1 | 12/2004 | Bunch |
| 2004/0267723 A1 | 12/2004 | Bharat |
| 2005/0015366 A1 | 1/2005 | Carrasco et al. |
| 2005/0021397 A1 | 1/2005 | Cui et al. |
| 2005/0027822 A1 | 2/2005 | Plaza |
| 2005/0033657 A1 | 2/2005 | Herrington et al. |
| 2005/0080772 A1 | 4/2005 | Bem |
| 2005/0086109 A1 | 4/2005 | McFadden et al. |
| 2005/0091106 A1 | 4/2005 | Reller et al. |
| 2005/0091111 A1 | 4/2005 | Green et al. |
| 2005/0097088 A1* | 5/2005 | Bennett et al. .................... 707/3 |
| 2005/0102202 A1 | 5/2005 | Linden et al. |
| 2005/0131762 A1 | 6/2005 | Bharat et al. |
| 2005/0149404 A1 | 7/2005 | Barnett et al. |
| 2005/0155031 A1* | 7/2005 | Wang et al. .................... 717/170 |
| 2005/0182773 A1 | 8/2005 | Feinsmith |
| 2005/0187823 A1 | 8/2005 | Howes |
| 2005/0216572 A1 | 9/2005 | Tso et al. |
| 2005/0222901 A1 | 10/2005 | Agarwal et al. |
| 2005/0222982 A1 | 10/2005 | Paczkowski et al. |
| 2005/0273463 A1 | 12/2005 | Zohar et al. |
| 2006/0015390 A1 | 1/2006 | Rijsinghani et al. |
| 2006/0031253 A1 | 2/2006 | Newbold et al. |
| 2006/0136524 A1 | 6/2006 | Wohlers et al. |
| 2006/0136528 A1 | 6/2006 | Martin et al. |
| 2006/0235965 A1* | 10/2006 | Bennett et al. ................. 709/224 |

FOREIGN PATENT DOCUMENTS

| | | |
|---|---|---|
| EP | 1207468 | 5/2002 |
| JP | 2002073545 | 3/2002 |
| WO | WO 99/38321 | 7/1999 |
| WO | WO 99/44159 | 9/1999 |
| WO | WO 99/46701 | 9/1999 |
| WO | WO 99/55066 | 10/1999 |
| WO | WO 00/04434 | 1/2000 |
| WO | WO 00/54201 | 9/2000 |
| WO | WO 01/03028 | 1/2001 |
| WO | WO 01/15052 | 3/2001 |
| WO | WO 01/39024 A2 | 5/2001 |
| WO | WO 01/44992 | 6/2001 |
| WO | WO 01/63472 | 8/2001 |
| WO | WO 01/69929 | 9/2001 |
| WO | WO 01/90917 | 11/2001 |
| WO | WO 03/010685 | 2/2003 |

OTHER PUBLICATIONS

International Search Report and Written Opinion of PCT/US06/08050 mailed on Oct. 19, 2007.

International Search Report and Written Opinion of PCT/US06/08049 mailed on Oct. 19, 2007.

Smith, Lindsay I., "A Tutorial on Principal Components Analysis"; Feb. 26, 2002.

ACM Portal USPTO Search, "Communications of the ACM: vol. 52, Issue 1", Association for Computing Machinery, dated Jan. 2009, 1 page.

Ad Close, Webpage [online]. C/net Downloads.com [retrieved on Oct. 4, 2001]. Retrieved from the Internet <URL http//download.cnet.com/downloads/0-10059-100-915154.html>.

Ad Muncher, Webpage [online]. C/net Downloads.com [retrieved on Oct. 4, 2001]. Retrieved from the Internet <URL:http//download.cnet.com/downloads/0-33567-18-100-2750044.html>.

AdDelete, Webpage [online]. C/net Download.com [retrieved on Oct. 4, 2001]. Retrieved from the Internet <URL:http//download.cnet.com/downloads/0-10059-100-7003126.html>.

Adextinguisher-Introduction and News Sections. Webpage [online][retrieved on Oct. 4, 2001]. Retrieved from the Internet URL:http//adext.magenet.net.html.

AdPurger, Webpage [online]. C/net Downloads.com [retrieved on Oct. 4, 2001]. Retrieved from the Internet <URL:http//download.cnet.com/downloads/0-10068-100-5067717.html>.

AdsOff, Webpage [online]. C/net Downloads.com [retrieved on Oct. 3, 2001]. Retrieved from the Internet <URL:http//download.cnet.com/downloads/0-10059-100-9 12651.html>.

AdSubract SE, Webpage [online]. C/net Downloads.com [retrieved on Oct. 4, 2001]. Retrieved from the Internet <URL:http//download.cnet.com/downloads/0-3356727-100-5963713.html>.

(56) References Cited

OTHER PUBLICATIONS

Advertising Killer, Webpage [online]. C/net Downloads.com [retrieved on Oct. 3, 2001]. Retrieved from the Internet <URL.http//download.cnet.com/downloads/0-10059-100-1539520.html>.
Advisory Action dated Nov. 19, 2008 issued in U.S. Appl. No. 11/015,583, 3 pages.
Aggarwal, Charu C. et al. 2001. Intelligent Crawling on the World Wide Web with Arbitrary Predicates. ACM, pp. 96-105.
AllGone, Webpage [online]. C/net Downloads.com [retrieved on Oct. 4, 2001]. Retrieved from the Internet <URL:http//download.cnet.com/downloads/0-10068-100-2915974.html>.
AnalogX Pow, Webpage [online]. C/net Downloads.com [retrieved on Oct. 3, 2001]. Retrieved from the Internet <URL:http//download.cnet com/downloads-0-3356748-100-915372.html>.
Bae, Sung Min, et al., "Fuzzy Web Ad Selector", IEEE Intelligent Systems, vol. 18 Issue 6, Nov./Dec. 2003, pp. 62-69.
Banner Zapper, Webpage [online]. C/net Downloads.com [retrieved on Oct. 4, 2001]. Retrieved from the Internet <URL:http//download.cnet.com/downloads/0-3356727-100-6384611.html>.
BanPopup, Webpage [online]. C/net Downloads.com [retrieved on Oct. 4, 2001]. Retrieved from the Internet <URL:http//download.cnet.com/downloads/0-10059-100-6901908.html>.
Black List. Webpage [online]. C/net Downloads.com [retrieved on Oct. 4, 2001]. Retrieved from the Internet <URL.http/download cnet.com/downloads/0-10059-100-902347 html>.
Broder, Alan J., "Data Mining the Internet and Privacy", WEBKDD '99, LNAI 1836, Springer-Verlag, Berlin, Germany, (c) 2000, pp. 56-73.
Bucklin, Randolph E., et al., "Choice and the Internet: From Clickstream to Research Stream", Marketing Letters, vol. 13, No. 3, Aug. 2002, pp. 245-258.
Claria—Company Information—Corporate Review, webpage [online], retrieved on Mar. 3, 2005, retrieved from the internet: <URL:http://www.claria.com/companyinfo.html>.
Close Popup 4.0, Webpage [online]. Take a Hike Software [retrieved on Oct. 4, 2001]. Retrieved from the Internet <URL:http//www.ryanware.com/close_popup.html>.
Close Popup, Webpage [online]. C/net Downloads.com [retrieved on Oct. 4, 2001]. Retrieved from the Internet <URL:http//download.cnet.com/downloads/0-10059-100-905799.html>.
CobraSoft PopStop, Webpage (online). C/net Downloads.com [retrieved on Oct. 4, 2001]. Retrieved from the Internet <URL:http//download cnet.com/downloads/0-10058-100-6926765.html>.
Compare Prices and Read Reviews on AdsOff! Epenions.com. Webpage [online]; Jan. 21, 2001. Obtained from corresponding International Application PCT Search Report.
Copernic, Copernic: Software to Search, Find, and Manage Information, Copernic Technologies, Inc. 2004, 2 pgs. (retrieved on Apr. 6, 2004). Retrieved from the Internet: <URL:http://www.copernic.com/en/index.html>.
CrushPop 2000, Webpage [online]. www.32bit.com [retrieved on Oct. 4, 2001]. Retrieved from the Internet <URL.http//32bit.com/software/listings/Internet/Special/180P/13794.html>.
Definition of "close button", Microsoft Press Computer Dictionary, 3rd ed. (Redmond WA: Microsoft Press, 1997).
Diligenti, Michelangelo et al. 2004. A Unified Probalistic Framework for Web Page Scoring Systems. IEEE, vol. 16, No. 1. Jan. 2004, pp. 4-16.
Directive 2002/58/EC of the European Parliament and of the Council of Jul. 12, 2002 concerning the processing of personal data and the protection of privacy in the electronic communications sector (Directive on privacy and electronic communications), Official Journal L 201 , Jul. 31, 2002 p. 0037-0047 (downloaded.
Dogpile, Dogpile Web Search Home Page, InfoSpace, Inc. 2004, p. 1 of 1, (retrieved on Apr. 1, 2004). Retrieved from the Internet: <URL:http://www.dogpile.com.html>.
DoubleClick products (17 total pgs); Webpage [online] [retrieved on Jun. 11, 2003]; Retrieved from the Internet: <URL: http://www.doubleclick.com>.

Eick, Stephen G., "Visual Analysis of Website Browsing Patterns", Visual Interfaces to Digital Libraries, Springer-Verlag, Berlin, Germany, (c) 2002, pp. 65-77.
Eirinaki, Magdalini, et al., "Web Mining for Web Personalization", ACM Transactions on Internet Technology (TOIT), vol. 3, Issue 1, Feb. 2003, pp. 1-27.
Favela, Jesus et al. 1997. Image-Retrieval Agent: Integrating Image Content and Text. IEE, vol. 1.14, pp. 36-39.
Fenstermacher, Kurt D., et al., "Client-Side Monitoring for Web Mining", Journal of the American Society for Information Science and Technology, vol. 54, Issue 7, May 2003, pp. 625-637.
Fenstermacher, Kurt D., et al., "Mining Client-Side Activity for Personalization", WECWIS 2002, (c) 2002, pp. 205-212.
Final Office Action dated Mar. 26, 2010 issued in U.S. Appl. No. 11/207,590, 8 pages.
Final Rejection dated May 21, 2008 issued in U.S. Appl. No. 11/015,583, 8 pages.
Friedman, Batya, et al., "Informed Consent in the Mozilla Browser: Implementing Value-Sensitive Design", HICSS-35 '02, Jan. 2002, pp. 10-19.
Fu, Xiaobin, et al., "Mining Navigation History for Recommendation", IUI 2000, New Orleans, LA, (c) 2000, pp. 106-112.
Google search for "define: close button", Mar. 2, 2007.
Google Search, "Result Search Query Build Search Engine Index Using Gather Consumer Navigate Search", http://scholar.google.com/scholar, dated Apr. 7, 2010, 3 pages.
Gralla, Preston, How the Internet Works, Special Edition, Ziff-Davis Press, Emeryville, CA, .(c) 1997, pp. 254 and 266-271.
Greening, Dan R., "Tracking Users: What Marketers Really Want to Know", Web Techniques, Jul. 1999, downloaded from: www.webtechniques.com/archives/1999/07/, pp. 1-9.
Heller, Laura, "Target gets mod in Manhattan", DSNRetailing Today, v40 n16, Aug. 20, 2001: 2, 37.
Hongyu Liu et al., "Focused Crawling by Learning HMM from User's Topic-Specific Browsing" Proceedings of the IEEE/WIC/ACM International Conference on Web Intelligence (WI '04) 0-7695-2100-2/04.
Hun, Ke et al. 2003. A Probabilistic Model for Intelligent Web Crawlers. IEEE, pp. 278-282.
InterMute, Webpage [online]. C/net Downloads.com [retrieved on Oct. 3, 2001]. Retrieved from the Internet <URL:http//download.cnet.com/downloads/0-10059-100-906599.html>.
International Search Report and Written Opinion of the International Search Authority for Intl. Appl. No. PCT/US05/45722 mailed Jan. 19, 2007.
International Search Report in PCT Appln. No. PCT/US2004/07714, mailed Mar. 31, 2005 [1 page].
Internet Citation: "Gator.com offers one-click shopping at over 5,000 e-commerce site today"; Jun. 14, 1999; XP002145278; Date retrieved: Jun. 28, 2001. URL:http://www.gator.com/company/press/pr061499b.html.
Ishitani, Lucila, et al., "Masks: Bringing Anonymity and Personalization Together", IEEE Security & Privacy, vol. 1, Issue 3, May/Jun. 2003, pp. 18-23.
Kiyomitsu, Hidenari, et al., "Web Reconfiguration by Spatio-Temporal Page Personalization Rules Based on Access Histories", Applications and the Internet, San Diego, CA, Jan. 8-12, 2001, pp. 75-82.
Klemm, Reinhard P., "WebCompanion: A Friendly Client-Side Web Prefetching Agent", IEEE Transactions on Knowledge and Data Engineering, vol. 11, No. 4, Jul./Aug. 1999, pp. 577-594.
Kourbatov, Opening a Window, Jul. 8, 2000, plublished by www.javascripter.net, whole document.
Langheinrich, M., et al. "Unintrusive Customization Techniques for Web Advertising," NEC Corporation, C&C Media Research Laboratories, Kanagawa, Japan, Computer Networks, vol. 31, No. 11, pp. 1259-1272, May 1999 (in Conf. Proc. 8th Int'l WWW Conf., Toronto, Canada, May 11-14, 1999).
Lee, Ching-Cheng, et al., "Category-Based Web Personalization System", COMPSAC 2001, Oct. 8-12, 2001, pp. 621-625.
Leuski, Anton et al. 2000. Lighthouse: Showing the Way to Relevant Information. IEEE, Oct. 2000, pp. 125-129.
Liu, Jian-Guo, et al., "Web Mining for Electronic Business Application", PDCAT 2003, Aug. 27-29, 2003, pp. 872-876.

(56) References Cited

OTHER PUBLICATIONS

Liu, Jian-Guo, et al., "Web Usage Mining for Electronic Business Applications", Machine Learning and Cybernetics, Shanghai, China, Aug. 2004, pp. 1314-1318.
Lu, Hongjun, et al., "Extending a Web Browser with Client-Side Mining", APWeb 2003, LNCS 2642, Springer-Verlag, Berlin, Germany, (c) 2003, pp. 166-177.
Luxenburger, Julia, et al., "Query-Log Based Authority Analysis for Web Information Search", WISE 2004, LNCS 3306, Springer-Verlag, Berlin, Germany, Nov. 1, 2004, pp. 90-101.
Marcebra Net, Webpage [online]. C/net Downloads.com [retrieved on Oct. 4, 2001]. Retrieved from the Internet <URL:http//download.cnet.com/downloads/0-3364666-100-5210875.html>.
Metacrawler, Web Search Home Page—MetaCrawler, InfoSpace, Inc. 2004, p. 1 of 1 (retrieved on Apr. 6, 2004), Retrieved from the internet: <URL:http://www.metacrawler.com.html>.
Mobasher, Bamshad, et al., "Automatic Personalization Based on Web Usage Mining", Communications of the ACM, vol. 43, Issue 8, Aug. 2000, pp. 142-151.
Mr. KillAd. Webpage [online]. C/net Downloads.com [retrieved on Oct. 4, 2001]. Retrieved from the Internet <URL:http//download.cnet.com/downloads/0-10059-100-895339 html>.
Nagger, Webpage [online]. C/net Downloads.com [retrieved on Oct. 4, 2001]. Retrieved from the Internet <URL:http//download.cnet.com/downloads/0-3356748-100-2497932 html>.
NoAds 2000.6.30.1, Webpage [online] south bay software [retrieved on Oct. 4, 2001]. Retrieved from the Internet <URL:http//www.southbaypc.com/NoAds.html>.
Non-Final Rejection dated Dec. 20, 2006 issued in U.S. Appl. No. 11/015,583, 8 pages.
Non-Final Rejection dated Jul. 20, 2009 issued in U.S. Appl. No. 11/015,583, 7 pages.
NoPops 1.1, Webpage [online]. WebAttack.com [retrieved on Oct. 4, 2001]. Retrieved from the Internet <URL:http//www.webattack.com/get/nopops.shtml>.
Office Action mailed Oct. 10, 2007 from U.S. Appl. No. 11/207,590, filed Aug. 19, 2005.
Office Action mailed Sep. 13, 2006 from U.S. Appl. No. 10/700,820, filed Nov. 4, 2003.
Office Action mailed Oct. 16, 2008 from U.S. Appl. No. 11/207,590, filed Aug. 19, 2005.
Office Action mailed Sep. 16, 2004 from U.S. Appl. No. 10/056,932, filed Jan. 25, 2002.
Office Action mailed Mar. 18, 2005 from U.S. Appl. No. 10/056,932, filed Jan. 25, 2002.
Office Action mailed Jun. 22, 2009 from U.S. Appl. No. 11/207,590, filed Aug. 19, 2005.
Office Action mailed May 24, 2007 from U.S. Appl. No. 10/700,820, filed Nov. 4, 2003.
Office Action mailed Apr. 25, 2006 from U.S. Appl. No. 10/700,820, filed Nov. 4, 2003.
Office Action mailed Dec. 26, 2006 from U.S. Appl. No. 10/700,820, filed Nov. 4, 2003.
Office Action mailed Jul. 27, 2005 from U.S. Appl. No. 10/056,932, filed Jan. 25, 2002.
Office Action mailed Sep. 5, 2003 from U.S. Appl. No. 10/056,932, filed Jan. 25, 2002.
Office Action mailed May 7, 2004 from U.S. Appl. No. 10/056,932, filed Jan. 25, 2002.
Office Action mailed Oct. 19, 2007 from U.S. Appl. No. 11/207,589, filed Aug. 19, 2005.
Paepcke, Andreas, et al., "Beyond Document Similarity: Understanding Value-Based Search and Browsing Technologies", ACM SIGMOD Record, vol. 29, Issue 1, Mar. 2000, pp. 80-92.
Paganelli, Laila, et al., "Intelligent Analysis of User Interactions with Web Applications", IUI '02, San Francisco, CA, Jan. 13-16, 2002, pp. 111-118.
Paraben's AdStopper, Webpage [online]. C/net Downloads.com [retrieved on Oct. 4, 2001]. Retrieved from the Internet <URL:http//download.cnet.com/downloads/0-10059-100-2643648.html>.
Park, Joon S., et al., "Secure Cookies on the Web", IEEE Internet Computing, vol. 4, Issue 4, Jul./Aug. 2000, pp. 36-44.
Payton, D., et al. 1999. Dynamic collaborator discovery in information intensive environments. ACM Comput. Surv. 31, 2es, Article 8 (Jun. 1999), pp. 1-8.
PCT International Search Report for application No. PCT/US02/35981, 3 sheets; mailed Apr. 4, 2003.
PCT International Search Report for Application No. PCT/US04/09918.
PCT International Search Report for PCT/US03/13985 mailed Aug. 8, 2003; total of 1 sheet.
PCT International Search Report re: International Application No. PCT/US05/29615 dated Feb. 20, 2006.
Pierrakos, Dimitrios, et al., "Web Usage Mining as a Tool for Personalization: A Survey", User Modeling and User-Adapted Interaction, vol. 13, No. 4, (c) 2003, pp. 311-372.
Pierre Maret, et al.; Multimedia Information Interchange: Web Forms Meet Data Servers; Proceedings of the IEEE International Conference on Multimedia Computing and Systems; vol. 2, Jun. 7-11, 1999, pp. 499-505; XP000964627; Florence, Italy.
Popki Popup Closer 1.4, Webpage [online]. WebAttack.com [retrieved on Oct. 4, 2001]. Retrieved from the Internet <URL:http//www.webattack.com/get/popki.shtml>.
PopKill, Webpage [online]. C/net Downloads.com [retrieved on Oct. 4, 2001]. Retrieved from the Internet <URL:http//download.cnet.com/downloads/0-10059-100-6967054.html>.
PopNot, Webpage [online]. C/net Downloads.com [retrieved on Oct. 4, 2001]. Retrieved from the Internet <URL http//download.cnet.com/downloads/0-10059-100-5112702.html>.
PopUp Eraser, Webpage [online]. C/net Downloads.com [retrieved on Oct. 4, 2001]. Retrieved from the Internet <URL:http//download.cnet.com/downloads/0-10059-100-6322841.html>.
Popup Hunter, Webpage [online]. C/net Downloads.com [retrieved on Oct. 4, 2001]. Retrieved from the Internet <URL:http//download.cnet.com/downloads/0-10059-100-1451171.html>.
PopUp Killer, Webpage [online]. C/net Downloads.com [retrieved on Oct. 3, 2001]. Retrieved from the Internet <URL.http//download.cnet.com/downloads/0-10059-100-7253644 html>.
Popup Smasher, Webpage [online]. C/net Downloads.com [retrieved on Oct. 4, 2001]. Retrieved from the Internet <URL:http/download.cnet.com/downloads/0-3364664-100-7209048.html>.
Pop-up stopper, Webpage [online]. C/net Downloads.com [retrieved on Oct. 3, 2001]. Retrieved from the Internet <URL:http//download.cnet.com/downloads/0-10059-100-6803957.sub.--html&- gt;.
PopupDummy, Webpage [online]. C/net Downloads.com [retrieved on Oct. 4, 2001]. Retrieved from the Internet <URL:http//download.cnet.com/downloads/0-10059-100-6943327.html>.
Privacy and Electronic Communications (EC Directive) Regulations 2003 (PECR), No. 2426, Electronic Communication, Sep. 2003.
Ready, Kevin et al., "Plug-n-Play Java Script" (Indianapolis, IN: New Riders Publishing, 1996): 19-22, 39, 40 and 43-45.
Restriction Requirement dated Oct. 31, 2007 issued in U.S. Appl. No. 11/015,583, 6 pages.
Schonberg, Edith, et al., "Measuring Success", Communications of the ACM, vol. 43, Issue 8, Aug. 2000, pp. 53-57.
Shahabi, Cyrus, et al., "Efficient and Anonymous Web-Usage Mining for Web Personalization", INFORMS Journal on Computing, vol. 15, No. 2, Spring 2003, pp. 123-148.
Shopping with WhenUShop, Webpage [on-line]; WhenU.com [retrieved on Mar. 19, 2002]. Retrieved from the Internet: URL:http://www.whenu.com.
SideStep, The Traveler's Search Engine; Webpage (online) (retrieved on Oct. 7, 2004); retrieved from the Internet: <URL:http://www.sidestep.com/main.html.
Soumen Chakrabarti et al., "Focused Crawling: A New Approach to Top-Specific Web Resource Discovery" Computer Networks 31 (1999), pp. 1623-1640.
Srivastava, Jaideep, et al., "Web Usage Mining: Discovery and Applications of Usage Patterns from Web Data", SIGKDD Explorations, vol. 1. Issue 2, Jan. 2000, pp. 12-23.
Surf in Peace 2.01, Webpage [online]. WebAttack.com [retrieved on Oct. 4, 2001]. Retrieved from the Internet <URL:http//www.webattack.com/get/sip.shtml>.

(56) References Cited

OTHER PUBLICATIONS

U.S. Appl. No. 09/993,887, filed Nov. 27, 2001, by Jax B. Cowden, et al.
U.S. Appl. No. 09/993,904, filed Nov. 27, 2001, by Jax B. Cowden, et al.
U.S. Appl. No. 09/993,906, filed Nov. 27, 2001, by Jax B. Cowden, et al.
U.S. Appl. No. 11/427,243—May 10, 2011 PTO Office Action.
Uehara, Satoru, et al., "An Implementation of Electronic Shopping Cart on the Web System Using component-Object Technology", Proc. of the 6th International Conf./ on Object-Oriented Real-Time Dependable Systems, Jan. 8-10, 2001, pp. 77-84.
Ultraseek Server Detailed Feature List, http://software.infoseek.com/products/ultraseek/ultrafeatures.htm, Accessed from Apr. 1998 archive from http://web.archive.org/web/19980419092128/http://software.infoseek.com/products/.
U.S. Appl. No. 09/993,888, filed Nov. 27, 2001, by Mark E. Pennell, et al.
Visual Search ToolBar—Graphically Enhance Search Results, 2004 Viewpoint Corporation; Webpage [online] [retrieved on Oct. 7, 2004]; retrieved from the Internet: <URL:http://www.viewpoint.com/pub/toolbar/download.html.
Web Magician, Webpage [online]. RocketDownLoad.com [retrieved on Oct. 4, 2001]. Retrieved from the Internet <URL:http/www.rocketdownload.com/Details/Inte/webmag.html>.
Wenyin, Liu, et al., "Ubiquitous Media Agents: A Framework for Managing Personally Accumulated Multimedia Files", Multimedia Systems, vol. 9, No. 2, Aug. 2003, pp. 144-156.
www.conversionruler.com/faq.php, Feb. 4, 2003.
Xu, Cheng-Zhong, et al., "A Keyword-Based Semantic Prefetching Approach in Internet News Services", IEEE Transactions on Knowledge and Data Engineering, vol. 16, Issue 5, May 2004, pp. 601-611.
Zaiane, Osmar R., et al., "Discovering Web Access Patterns and Trends by Applying OLAP and Data Mining Technology on Web Logs", IEEE International Forum on Research and Technology Advances in Digital Libraries, Santa Barbara, CA, Apr. 22-24, 1998, pp. 19-29.
Zero Popup, Webpage [online]. C/net Downloads.com [retrieved on Oct. 4, 2001]. Retrieved from the Internet <URL:http//download.cnet.com/downloads/0-3356748-100-7163307.html>.

\* cited by examiner

METHOD FOR ATTRIBUTING AND ALLOCATING REVENUE RELATED TO EMBEDDED SOFTWARE

RELATED APPLICATION

This application claims the benefit of U.S. Provisional Patent Application No. 60/659,682, entitled "Athena-Related Analytical Methods and Devices" filed on Mar. 7, 2005 by Mitchell Weisman, Craig Zeldin, David Goulden, Eric McKinlay and Dominic Bennett. That application is incorporated by reference for all purposes.

BACKGROUND OF THE INVENTION

The present invention relates generally to the field of software marketing, and more particularly to the field of embedded software. Particular aspects of the present invention are described in the claims, specification and drawings.

Software lends itself to a number of distribution channels, apart from conventional sale or licensing of computer programs. One such channel is so-called shareware, in which a user is given a copy of the software, either in a demonstration, partially functional or fully functional version, and if the user wishes to continue using the product after a stated trial period, a license fee is paid to the producer. A variation on that theme is known as "freeware," where no fee at all is charged. These systems are most often utility programs and the like, produced by enthusiasts.

A relatively recent form of software distribution may be termed "embedded software." This term refers to situations in which a commercial entity seeks to gain some commercial advantage through a software installation on a user's computer, and it provides software desirable to the user to induce that use. The software desired by the user is bundled with software of interest to the distributor. A familiar example of this type is the Google toolbar, distributed by the Google search engine provider. Google distributes the toolbar, which offers several useful functionality features, including allowing a user to perform an internet search directly from the browser. Of course, the search is performed on Google, which benefits Google directly, but the user also gains in being able to perform rapid searching, as well as other features offered on the toolbar.

A number of US Patent Applications filed by the assignee of the present invention address a form of this software, in which a behavior monitoring module is resident on a client computer. That module records the user's internet activity and reports that information via cookies to a host system. In return, distributors of the module provide utility applications such as screen savers and the like to the user. Examples or such applications include U.S. patent application Ser. No. 11/226,066, entitled "Method and Device for Publishing Cross-Network User Behavioral Data" filed on Sep. 14, 2005, published as US 2006-0136528 A1 on Jun. 22, 2006, and issued as U.S. Pat. No. 7,693,863 on Apr. 6, 2010.

Such behavior monitoring applications can be used to provide targeted content, including advertising, to the user. Exposure of such advertising, as well as a user's response to the same, generates revenue from the host to the module's distributor. A problem can arise, however, when more than one such module is resident on a client computer. There, a revenue stream is generated, but attributing that revenue to a particular source is difficult. Most industry participants take the easy solution in this situation, eliminating any revenue participation by a second module.

That difficulty can have repercussions in the market. If, for example, a non-trivial number of client computers on which a given module is installed already have a module present, the resulting reduction of revenue may motivate a distributor against investing in such a marketing program.

A need exists, therefore, for a system for attributing revenue for such subscription-based software systems. The attribution must allow for multiple-module participation while remaining generally fair to the first-installed system. The method must also be easy to administer and capable of running from the module itself, which must recognize other modules within a client environment.

SUMMARY OF THE INVENTION

An aspect of the invention is a method for attributing revenue for embedded software. The method includes the first step of determining the presence of more than one type of embedded software on a given client site. Then, the process assigns priority based on the length of time each type has resided on the client system and the source of each type, followed by classifying each software type, based on the history of present and predecessor copies of the software. A distribution factor is applied to each software type, based on priority and classification, partner revenue is distributed based on the distribution factor applied to each software type.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Figure 1:
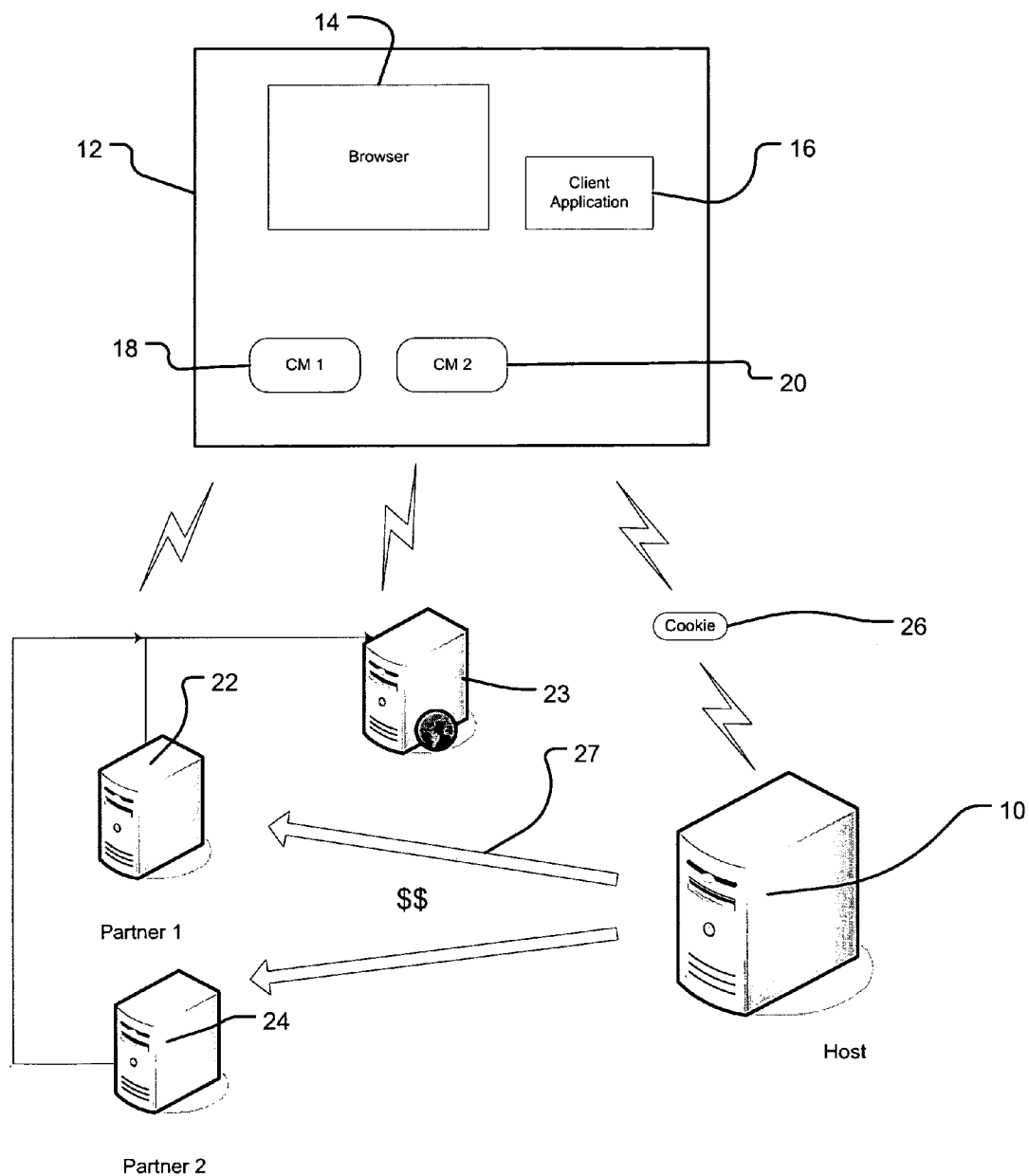
FIG. 1 illustrates the relationship between the host organization, partner distributors, and the client location.

FIG. 1 illustrates the interaction between various systems that characterizes the environment of the present invention. There, a host 10 is the producer of client modules, such as resident modules CM1 and CM2, identified as items 18 and 20, which are resident on a client system 12. Here, a client system can refer to any computer, but most specifically a computer on which an internet browser 14 operates. It should be clear that the definition of client systems and browsers is very broad, encompassing any computing device capable of accessing the internet, as well as the range of browsers from Firefox and Opera to Microsoft Internet Explorer. That breadth is intentional, as the field for the present invention is as wide as the internet.

Here, two client modules are resident on the client system, distributed by firms other than Host, here designated Partner 1 (item 22) and Partner 2 (item 24). Following the normal practice in the industry, the partners may distribute software directly to the user, or software may be provided to a website 23 operated by some third party, who then distributes the software to the user.

As noted above, the package distributed to the client computer includes a client application 16 that is of interest to the user. This may be a screen saver, system utility or game, or other. Of interest to the supplier is the module CM1 or CM2, which may offer functionality of direct benefit to the supplier, such as providing a toolbar that directs traffic to the partner's site. Of indirect benefit are modules that provide customer information. Typically such information is gathered and collated by the client module, and it may be periodically transmitted to the host in a cookie 26 or via direct data transmission. Typical of such applications is the system described in U.S. patent application Ser. No. 11/226,066, entitled "Method and Device for Publishing Cross-Network User Behavioral Data" filed on Sep. 14, 2005, published as US 2006-0136528 A1 on Jun. 22, 2006, and issued as U.S. Pat. No. 7,693,863 on Apr. 6, 2010.

Data provided to the Host system results in some revenue-generating action. A straightforward application might be the display of advertising material on the user's desktop, for example. The Host could be compensated based on the number of advertisements displayed, the number of click-throughs generated, or some other metrics. Those details are known in the art and form no part of the present invention. For purposes of explaining operation of the present invention, it suffices to note that revenue is generated.

As a result of the activity reported by the client modules to Host 10, the latter directs a revenue stream 27 to each partner. In this instance, however, it is difficult to determine which partner should receive what revenue, owing to the presence of two client modules on the client computer. It should be noted that the number of modules present may not be limited to two. If the user is active on the internet, it is possible that a number of modules will have been introduced to the same client computer, along with various utility applications. The process described below will deal with any number of modules present in a single client system.

Figure 2:
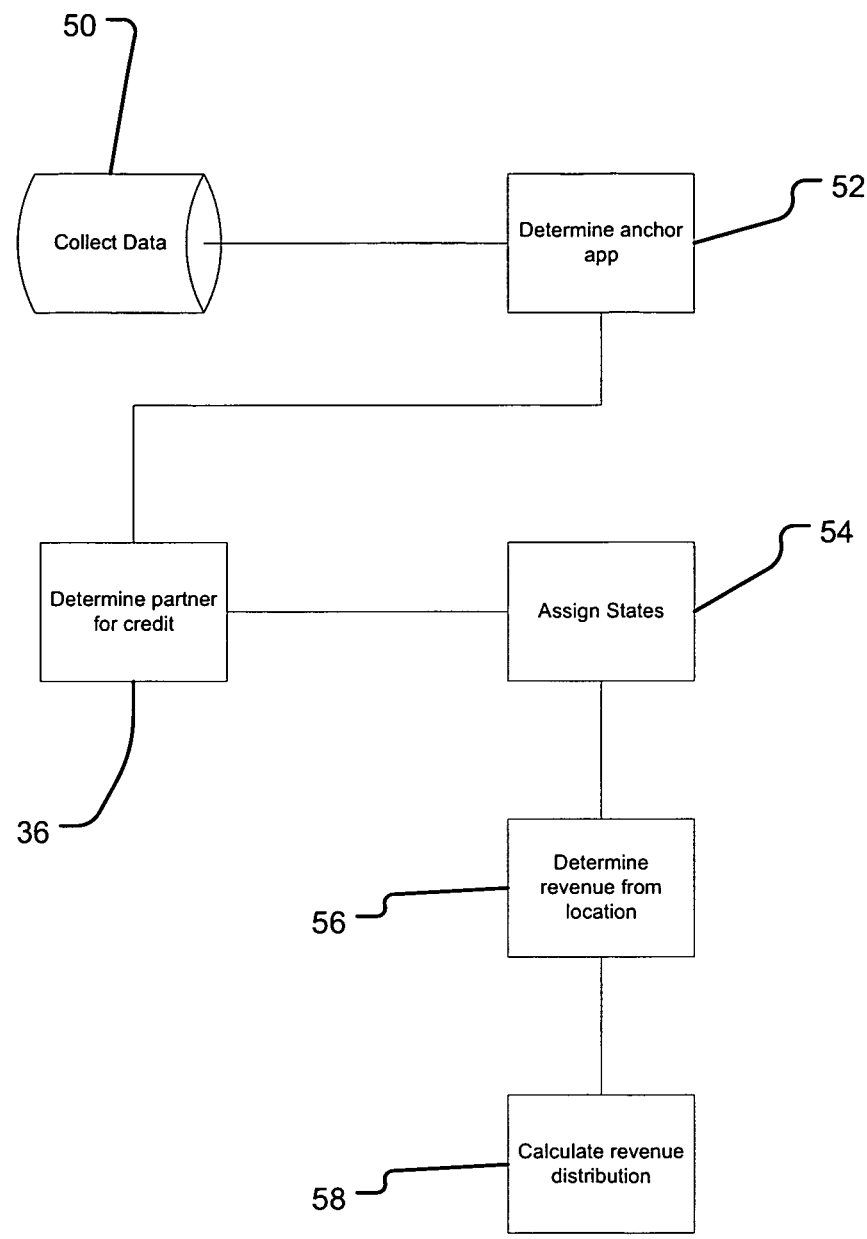
FIG. 2 depicts and embodiment of a process for allocating and attributing a revenue stream related to subscription-based software.

A process for attributing the revenue associated with several client modules is shown in FIG. 2. As seen there, the first step 50 is to collect data, accomplished by receiving and processing cookies 26 or transmissions in a known manner. Each client computer is assigned a unique ID number, which identifies a computer without including any individual-specific data about the user. Similarly, cookies identify the client module providing the data, which in turn allows the Host company to identify the partner responsible for that module. Alternatively, the modules can communicate data directly to Host as desired, as is known in the art. Thus, in the course of processing the data it will become apparent that certain data are originating from the same computer but from different client modules.

The system then proceeds to determine the "anchor" applications on a particular client computer, in step 52. This determination involves a check of the tenure of each module on the particular system, and the underlying rationale is that splitting revenue among partners who contributed regarding a particular client system is important, but each partner should only be represented once, even when multiple applications are running. That data is available at the Host, which can quickly determine which applications from a particular partner have been on the client system the longest. Those applications are deemed "anchor" applications, and they are used for further calculation of attribution rates. Generally the process of assigning anchor applications reduces the number of revenue contestants to two, though there may be a higher number in particular circumstances.

Figure 3:
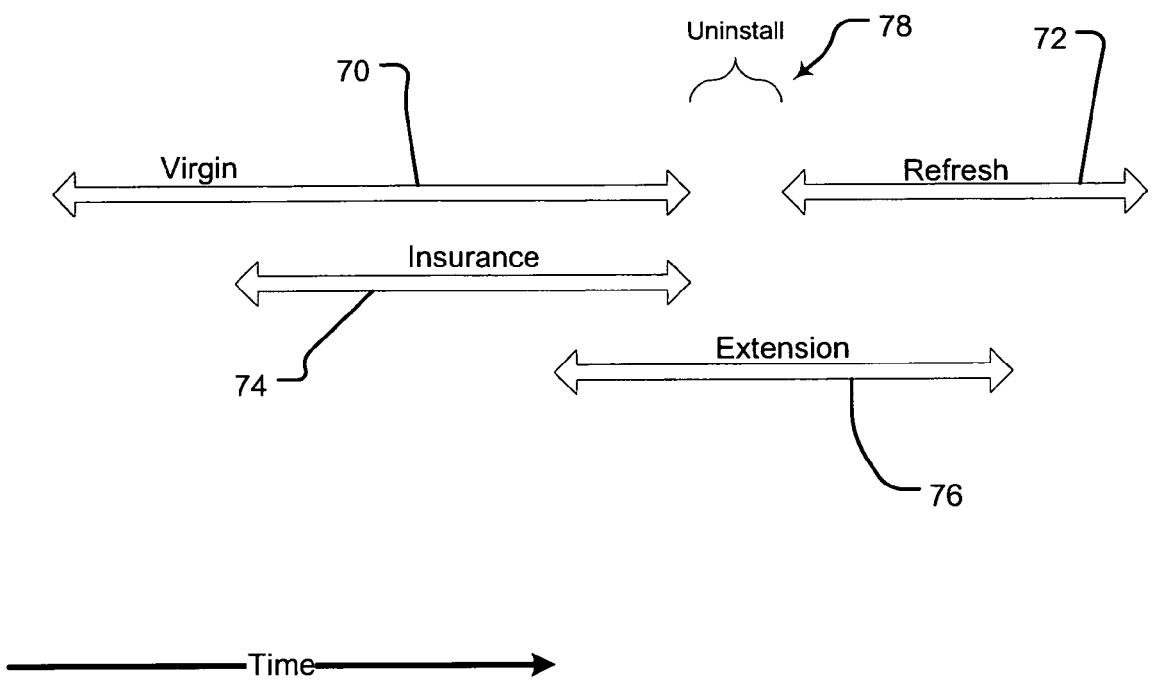
FIG. 3 depicts a schema for designating application states based on tenure and environment in a client location.

Next, in step 54, each anchor application is assigned a state. State criteria are best seen in FIG. 3, which makes clear that the rationale for various states is to recognize and reward the various roles played by applications installed at various times. In this drawing, time is the horizontal dimension, with various module versions being resident on the specific client computer for the times indicated.

The most obvious state is state 70, labeled "virgin". This state occurs when a module is the first application installed on a machine. This event is of course particularly valuable, and that status is rewarded accordingly.

Addition of a second module is an event that must be treated as significant, however, even though a first module is then operable, for the reasons discussed above. In the example shown, a second application 74 is installed at some time after the "virgin" application 70. The new application will not gather any more information regarding monetization than does the existing one, so it is classified as an "insurance" application. That is, the information it provides is recognized as duplicative as long as the "virgin" application continues to function, but the importance of having that application in place is recognized and compensated.

FIG. 3 also illustrates a common event in the history of client application modules, namely the likelihood that at some point all existing applications will be uninstalled. Whether the uninstall results from a system crash, or reconfiguration, or other action, the result is the same—at least some existing application modules disappear, and no further data is forthcoming from the client location, as shown at the gap labeled "uninstall" and indicated by arrow 78.

Here, if one of the existing "insurance" applications may survive the uninistall of other applications, so that location coverage actually continues uninterrupted, in spite of the loss of the "virgin" application and possible one or more "insurance" applications. Such an application is termed an "extension" application 76.

In the event that no "extension" application is present, another application may be installed at some time after the uninstall event. Such an application is labeled a "refresh" application 72, to distinguish it from a "virgin" application that is installed at a location never before covered by a Host application.

Next, as shown in step 56, the revenue associated with a particular location must be determined. The exact methods for performing that calculation will vary depending on the particular business involved, as will be understood by those in the art. In the example of a system that monitors user behavior and participates in an advertising system, revenue might be calculated on a sum of set rates per impression, per click-through, and per transaction that results in a purchase. Many other combinations of factors are known in the industry. The result of any such calculation is a total that represents the amount of revenue generated by a specific location for the time period involved, the latter most generally being a month.

With the total revenue figure in hand, the share of that revenue that is paid to the partner responsible for generating that revenue is determined, in step 58. Almost invariably, the details of any such division will be governed by the specific contract between the parties. Some generalization is possible, however, in setting out the present solution to the problem described above. Rather than a set rate, which has been a norm, parties following the present invention can set out a rate schedule based on the state of the client application. Based on the classifications set out in FIG. 3, a partner could be allocated a share of revenue based on Table 1.

TABLE 1

| Revenue Share vs. Application State | | |
| --- | --- | --- |
| Virgin | Extension/Refresh | Insurance |
| 50% | 30% | 10% |

As might be expected, a partner receives the highest revenue share for a "virgin" state, one which is opened for the first time. A reduced rate, but still substantial, is paid for an "extension" or "refresh" state, as those situations remains productive. Unlike any previous systems, however, the present invention allows for payment in the "insurance" state, in which the particular application is completely redundant. The utility of having a backup system, and for incenting partners to continue their placement programs, produces significant market advantages in terms of the actual number of systems in the field and operating at any given time.

Those in the art will appreciate that a number of variations are possible on the general principles set out here. While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

We claim as follows:

1. A method, comprising:
   determining a first revenue distribution factor for a client computer system based at least in part on a first tenure of a first embedded software on the client computer system, the first tenure including a first length of time from installation of the first embedded software until the determining the first revenue distribution factor;
   determining a second revenue distribution factor for the client computer system based at least in part on a second tenure of a second embedded software on the client computer system, the second tenure including a second length of time from installation of the second embedded software until the determining the second revenue distribution factor,
      wherein the second tenure is less than the first tenure, and
      wherein the first and second embedded software includes a first and second behavior monitoring application configured to provide targeted content to the client computer system, the targeted content based on at least a recorded behavior;
   determining a third revenue distribution factor for the client computer system based at least in part on an uninstallation of the first embedded software and in response to the uninstallation, configuring the second behavior monitoring application to provide the targeted content to the client computer system; and
   distributing partner revenue based at least in part on the first, second, and third revenue distribution factors and a rate schedule, the rate schedule configured to distribute a largest share of the partner revenue to an entity associated with the first revenue distribution factor.

2. The method of claim 1, further comprising determining a fourth revenue distribution factor based at least in part on a previous copy of the first embedded software that was resident in the client computer system.

3. The method of claim 1, further comprising determining a fourth revenue distribution factor based at least in part on a prior embedded software that was installed on the client computer system prior to at least a partially duplicative embedded software installed on the client computer system.

4. The method of claim 1, further comprising determining a fourth revenue distribution factor based at least in part on uninstalled embedded software which remained in response to an uninstallation of at least a partially duplicative embedded software on the client computer system.

5. The method of claim 1, further comprising determining a fourth revenue distribution factor based at least in part on other embedded software installed after uninstallation of at least a partially duplicative embedded software on the client computer system.

6. The method of claim 1, further comprising:
   determining a presence of the first embedded software in a computer-readable storage medium of the client computer system.

7. The method of claim 6, further comprising:
   determining an other presence of an other embedded software in the computer readable storage medium of the client computer system; and
   identifying the other embedded software as duplicative of the first embedded software.

8. The method of claim 7, wherein the first embedded software is considered to be duplicative of the other embedded software in response to the first embedded software being duplicative of the other embedded software.

9. The method of claim 7, wherein the first embedded software is an earlier version of the other embedded software.

10. The method of claim 1, wherein another embedded software is associated with another entity and wherein the entity is distinct from the another entity.

11. The method of claim 1, further comprising determining a fourth revenue distribution factor based at least in part on a previous copy of an other embedded software that has been resident in the client computer system.

12. The method of claim 1, wherein the first, second, and third revenue distribution factors are determined at predetermined times.

13. The method of claim 12, wherein the first, second, and third revenue distribution factors are determined on a monthly basis.

14. The method of claim 1, wherein the rate schedule is further configured to distribute a smaller share of the partner revenue to a second entity associated with the third revenue distribution factor.

15. The method of claim 14, wherein the rate schedule is further configured to distribute a smallest share of the partner revenue to a third entity associated with the second revenue distribution factor.

16. A non-transitory computer-readable medium storing executable instructions that, when executed, cause a computer to perform operations comprising:
   determining a first revenue distribution factor for a client computer system based at least in part on a first tenure of a first embedded software on the client computer system, the first tenure including a first length of time from installation of the first embedded software until the determining the first revenue distribution factor;
   determining a second revenue distribution factor for the client computer system based at least in part on a second tenure of a second embedded software on the client computer system, the second tenure including a second length of time from installation of the second embedded software until the determining the second revenue distribution factor, wherein the second tenure is less than the first tenure, and wherein the first and second embedded software includes a first and second behavior monitoring application configured to provide targeted content to the client computer system, the targeted content based on at least a recorded behavior;

determining a third revenue distribution factor for the client computer system based at least in part on an uninstallation of the first embedded software and in response to the uninstallation, configuring the second behavior monitoring application to provide the targeted content to the client computer system; and distributing partner revenue based at least in part on the first, second, and third revenue distribution factors and a rate schedule, the rate schedule configured to distribute a largest share of the partner revenue to an entity associated with the first revenue distribution factor.

* * * * *